United States Patent [19]
Garrett

[11] Patent Number: 5,149,942
[45] Date of Patent: Sep. 22, 1992

[54] HOT MIRROR TO PREVENT CONDENSATION IN HUMID ENVIRONMENTS

[76] Inventor: James A. Garrett, 505 Wimbledon Road, NE., Atlanta, Ga. 30324

[21] Appl. No.: 710,374

[22] Filed: Jun. 3, 1991

Related U.S. Application Data

[63] Continuation-in-part of Ser. No. 564,647, Aug. 9, 1990, abandoned.

[51] Int. Cl.[5] ............................................. H05B 3/20
[52] U.S. Cl. ................................... 219/219; 219/386; 219/521
[58] Field of Search ............... 219/385, 386, 521, 219, 219/518

[56] References Cited

U.S. PATENT DOCUMENTS

| | | |
|---|---|---|
| 281,224 | 7/1883 | Goodsell et al. |
| 1,465,292 | 8/1923 | Wessig. |
| 1,843,067 | 1/1932 | De Terra ............................ 219/219 |
| 2,257,049 | 10/1950 | Aagesen ............................ 219/385 |
| 2,796,506 | 6/1957 | Lumbert. |
| 3,513,290 | 5/1970 | Burley et al. |
| 4,050,003 | 9/1977 | Owings et al. |
| 4,060,712 | 11/1977 | Chang. |
| 4,241,290 | 12/1980 | Folland ............................. 219/219 |
| 4,256,697 | 3/1981 | Baldwin ............................ 219/535 |
| 4,278,870 | 7/1981 | Carleton ........................... 219/219 |
| 4,354,092 | 10/1982 | Manabe et al. |
| 4,580,035 | 4/1986 | Lüscher ............................ 219/518 |
| 4,701,594 | 10/1987 | Powell. |
| 4,757,183 | 7/1988 | Karey et al. |
| 4,763,381 | 8/1988 | Williams. |
| 4,803,341 | 2/1989 | Barowski .......................... 219/385 |

FOREIGN PATENT DOCUMENTS

| | | |
|---|---|---|
| 2129295 | 8/1982 | Australia. |
| 2034741 | 1/1972 | Fed. Rep. of Germany. |
| 0016145 | 1/1986 | Japan. |

Primary Examiner—Teresa J. Walberg
Attorney, Agent, or Firm—Pitts and Brittian

[57] ABSTRACT

A, completely non-fogging mirror device, for use in high heat/humidity environments, such as a shower. This device has a relatively permanent storage/heating housing and a portable mirror unit that fits within a cavity in the housing unit, this portable mirror unit having a reflective surface. The reflective surface is heated by transferring heat from a heating element within a storage housing, the heater element being energized from a power supply. Actual heating of the reflective surface is from a reservoir of liquid permanently stored within the mirror unit such that the reflective surface retains an elevated temperature to prevent fogging while the liquid remains hot. A thermostat is provided to regulate the temperature of the heater element, and thus the liquid. Also, there is provided a timer unit with an optional sound-producing unit to govern the heating time. An accessory unit is described that permits hanging the mirror unit, after heating, in any location in the environment where is will be useful.

18 Claims, 2 Drawing Sheets

HOT MIRROR TO PREVENT CONDENSATION IN HUMID ENVIRONMENTS

This is a continuation-in-part application based upon parent application Ser. No. 07/564,647 filed Aug. 9, 1990, now abandoned.

TECHNICAL FIELD

This device relates to portable mirrors in general, and more particularly concerns a portable mirror with a means for pre-heating the same to prevent fogging or misting in a high heat/high humidity environment, such as a shower.

BACKGROUND ART

It is a well-known fact that the warm moisture present in a high heat/high humidity environment, such as in a shower, for instance, or a bathroom near or including a shower, condenses on the cold surface of objects such as mirrors and plumbing fixtures. While this phenomenon may not have much effect on plumbing fixtures, a mirror being used in such an environment is rendered completely unusable thereby, at least temporarily. To circumvent the effects of this situation, the device of the present invention has been provided.

Prior art in this field known to the inventor of the present invention includes Japanese patent 0,016,145, United Kingdom (Australia) patent 2,129,295, West German patent 2,034,741, and U.S. Pat. Nos. 281,224, 2,796,506, 4,060,712, 4,701,594, and 4,763,381.

The device of the Japanese patent is intended to prevent icing and frosting of a mirror mounted on the outside of a motor vehicle by electrically heating a glass substrate of such mirror. This is a fixed attachment type application of the principle involved, such a device being permanently attached to a motor vehicle, and having permanently attached wiring from such a mirror to a power source of such a motor vehicle. It was never intended to be portable, nor was it intended for indoor or personal use, such as for shaving, for instance.

The device of the UK patent heats a mirror surface by relying on a flow of heated water through a separate chamber in contact with such a mirror surface. This device must be attached to at least one tube conducting heated water from a source and thus, cannot be completely portable. Moreover, the water-conducting tube is required to be attached to an adapter which must have been previously installed onto a water supply outlet.

The West German patent, as best understood, has a heater element attached to the rear of the mirror thereby requiring continuous connection to a stationary electrical source during use. This would substantially reduce any portability of the device.

The U.S. patents are very similar: the '224 reference has an electrically-supplied heating element at the rear of the mirror, the electrical source is not specifically defined; the '506 reference teaches a fixed mirror that is cleared with air directed across the mirror, the air being heated in one embodiment; the '712 reference teaches a fixed mirror with rear surface heating via an electrically-energized heater for defogging; in the '594 reference another type of fixed mirror is described that uses heated air blown across the surface of the mirror; and the '381 reference describes a vehicle rear view mirror that is heated either with a heated liquid from a tank and/or by electrical heaters, this mirror being substantially fixed in position.

None of the above-described devices is truly portable, with possibly the exception of that of the '224 reference, and they require electrical connections for either operation of blowers and/or heating elements. Thus, it is clear that a need exists for a fully portable non-fogging mirror that can be used in any location without any attachments thereto since prior art devices have failed to provide such a device.

Accordingly, it is an object of the present invention to provide an improved, non-fogging mirror.

It is also an object of the present invention to provide such an improved non-fogging mirror which is completely portable and self-contained when being used.

Another object of the present invention is to provide a base unit for the selective storage of the non-fogging mirror and which heats the mirror to a sufficient temperature to prevent fogging during use, with the base unit serving to selectively support the mirror for use in one application.

It is a further object of the present invention to provide such an improved non-fogging mirror with attachments for aiding in suspending, standing, and using such a mirror in a preferred embodiment, such as in a shower, for instance.

These and other objects and advantages of the present invention will become readily apparent from the following detailed description, when taken together with the accompanying drawings identified below.

DISCLOSURE OF THE INVENTION

In accordance with the present invention, there is provided a portable, non-fogging mirror. A mirror body contains a reflecting surface, commonly referred to as a mirror, which can be made of any reflective material, such as, but not limited to, glass, metal, or plastic, for instance. In a typical embodiment, this mirror surface is a chromium-plated copper sheet. This mirror body, which is typically fabricated from a suitable plastic or fiber glass, contains an enclosed reservoir of a liquid that can be heated. Typically, this liquid is water. Insulation is provided around the reservoir in the preferred embodiment, except in a direction of the mirror surface, so that any heat of the liquid can be transferred to the mirror surface. This body is provided with various external configurations that can be used for securing the mirror in various positions and locations such that it need not be hand-held during use. A base unit is complimentary to the mirror, this base unit having a cavity to receive at least a portion of the mirror whereby the liquid can be heated to a temperature sufficient to prevent fogging during use. This base unit can be provided with an external recess to support the portable unit therefrom, if desired. A heating element is provided in the base unit so as to be proximate the mirror surface of the portable unit. When energized, the heating element transfers heat to the liquid in the reservoir. The energization of the heater from an electrical source can be controlled by a timer and/or a thermostat set at the desired temperature, or by an appropriate switch. Thus, when the portable unit is inserted into the cavity of the base unit and the heater energized, the mirror surface attains a selected temperature that will prevent condensation of moisture thereupon, thereby preserving the usability as a mirror regardless of the effects of the environment in which such mirror is used.

BEST MODE FOR CARRYING OUT THE INVENTION

Figure 1:
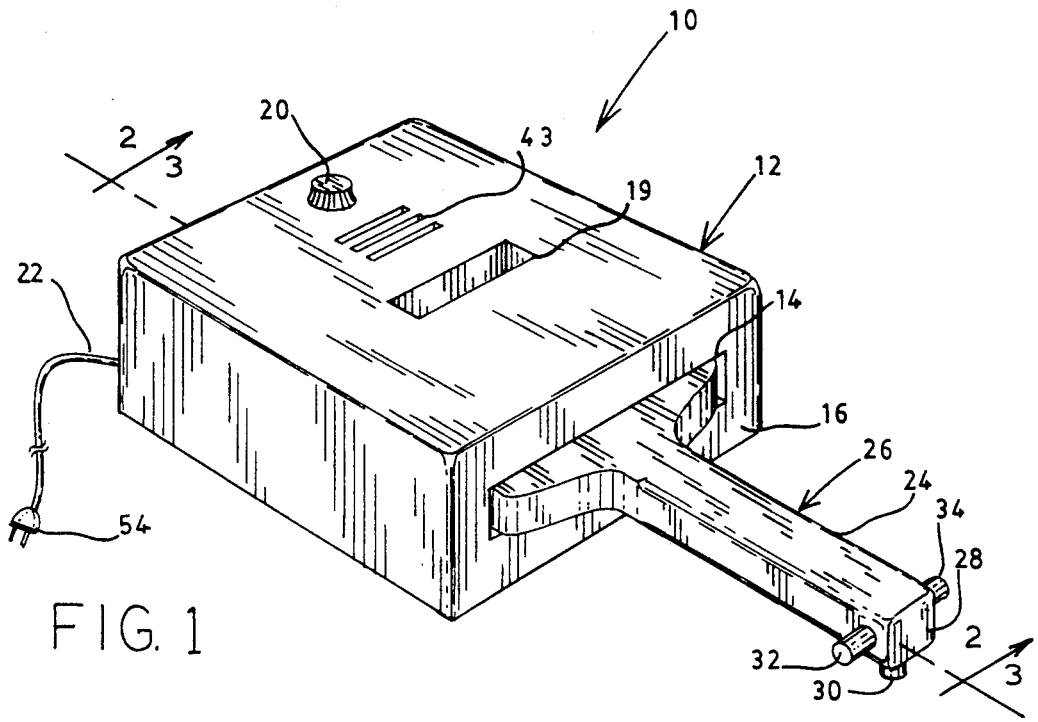
FIG. 1 is a perspective view of a device constructed in accordance with various features of the present invention.

Referring to the drawings, wherein like numerals designate like parts, and more specifically to FIG. 1, an improved non-fogging mirror unit is designated generally at 10.

The device 10 is comprised of housing 12 that defines a cavity 14 that opens at one side surface 16 of housing 12 for purposes described hereinafter. The housing 12 can be constructed of any suitable material, such as plastic, fiber glass, or the like. Mounted on a top surface 18 of the housing 12 typically is a timer means 20, and a power supply cord 22 is provided to supply the electrical components of the present invention as illustrated in FIG. 4. Of course, it will be understood that the timer means 20 can be located on other surfaces of the housing 12. The top surface 18 is provided with a recess 19 to receive a distal end 28 of the portable portion (see FIG. 2) of the invention when such is to be held thereby. The interior components of the housing 12 will be described in connection with FIG. 3.

In this FIG. 1 the handle 24 of the portable portion 26 of the present invention can be seen projecting out from the cavity 14. The distal end portion 28 of this handle 24 is provided with a projection 30 at approximately ninety degrees from the long axis of the handle and generally ninety degrees relative to the long dimension of the cavity 14. This projection 30 assists in the support of the distal end portion 28 from a counter or other flat surface (not shown) upon which the housing 12 is placed. In addition, outward side oppositely-directed projections 32, 34 are located near the distal end 28 that are oriented at ninety degrees from the long axis of the handle, but about parallel with the long dimension of the cavity 14. These projections 32, 34 aid in the support of the handle in the above-mentioned recess 19 in the top of the housing 12 as well as in the support of the portable unit from the accessory shown in FIG. 5.

Figure 2:
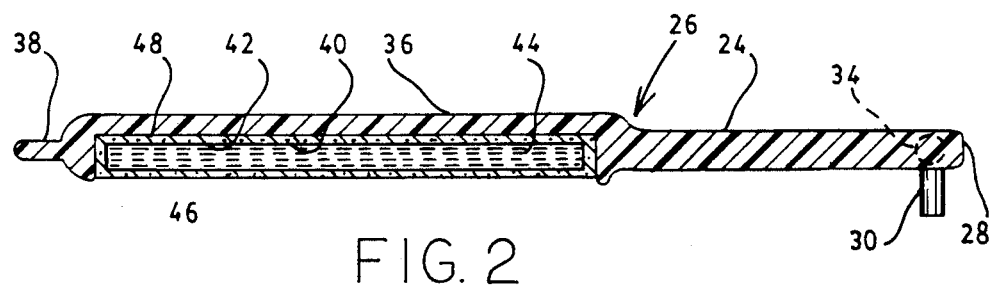
FIG. 2 is a cross-sectional view of the portable mirror portion of the present invention taken at 2—2 in FIG. 1.

Referring now to FIG. 2, which is a cross-section taken at 2—2 of FIG. 1, shown is the portable portion 26 of the present invention. The cross section is taken along the long axis of the handle 24. This unit has a generally thin body 36 from which projects the handle 24. The body, in addition, has a projection 38 that extends in an opposite direction from the handle 24, as shown, for purposes to be described relative to FIG. 3. There is a cavity 40 within the body 36 into which is fitted a reservoir 42 that contains a liquid 44 that can be heated, the liquid typically being water. The cavity 40 is closed on one side with a reflecting surface 46 such as a chromium-plated copper plate to form the actual mirror. Of course, other reflective materials can be used. Placed within the cavity 40, on the opposite side of the reservoir 42 from the reflecting surface 46 is a region of insulation 48 that reduces heat loss from the reservoir except in a direction toward the reflecting surface. It should be noted that the reservoir is in close proximity to the back of the reflecting surface to maximize heat transfer between the reservoir and that surface. The projection 30 at the distal end of the handle 24 has been described in connection with FIG. 1.

Figure 3:
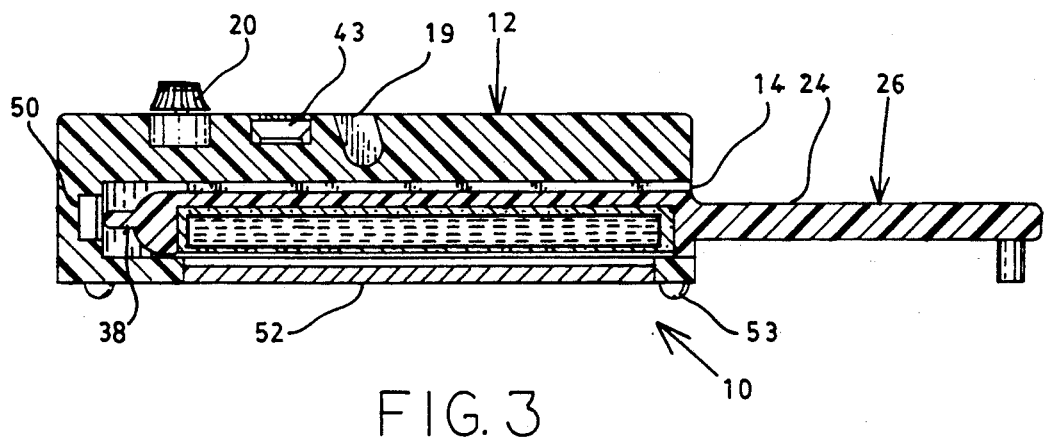
FIG. 3 is a cross-sectional view of the present invention illustrating the portable mirror portion inserted in the cavity of the base unit taken at 3—3 in FIG. 1.
Figure 4:
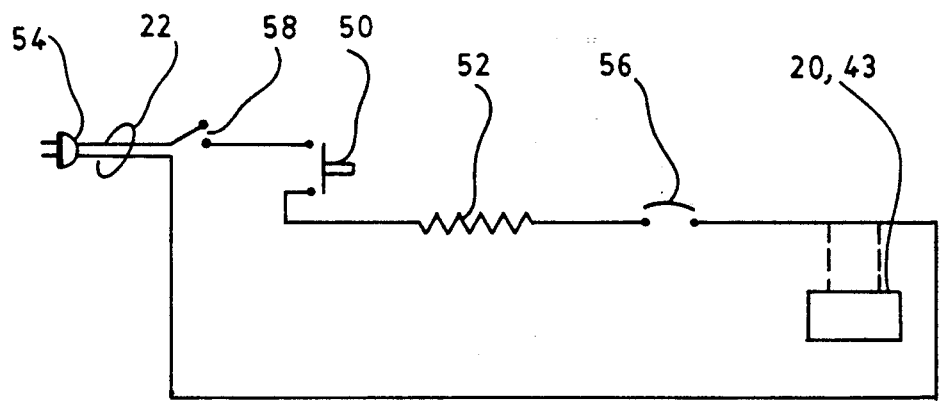
FIG. 4 is a schematic diagram of the electrical circuit components of the device of FIG. 1.

The combined components of FIG. 1 are shown in cross section in FIG. 3. Positioned at the closed end of the cavity 14 is a pressure actuatable switch 50. This is operated by the afore-mentioned projection 38 so that when the portable portion 26 of the invention is inserted within the cavity 14, the projection 38 causes the switch 50 to be activated and thus activate the electrical circuit of the device. Connected in series with the switch is a thermostat (see FIG. 4) and a heater element 52 mounted within the housing 12. Thus, when the heater element 52 is energized through the switch 50 and the cord 22, heat is generated that is transferred through the reflecting surface 46 to the reservoir 42 and thus into the liquid 44. The timer means 20 can be completely mechanical, or can be electrical and interposed within the electrical circuit as suggested in FIG. 4. The timer is preferably provided with a sound means 43 to indicate the expiration of a set time, with this sound means being either mechanical or electrical in operation. Support feet 53 can be provided on the bottom of the housing 12, if desired.

A schematic drawing of the electrical circuit of the present invention is shown in FIG. 4. Power is supplied through the cord 22 from any source, and typically a plug 54 at the end of cord 22 permits connection to that source. In series in this circuit is the heater element 52, the switch 50 and the thermostat 56. Alternatively, as indicated with the broken line, the timer 20 and sound means 43 can have contacts in the circuit to interrupt current flow to the heater and activate the sound means, if desired. Preferably the circuit will contain an on/off switch 58. This switch 58 can either mounted in the housing 12 or in the power cord 22.

Figure 5:
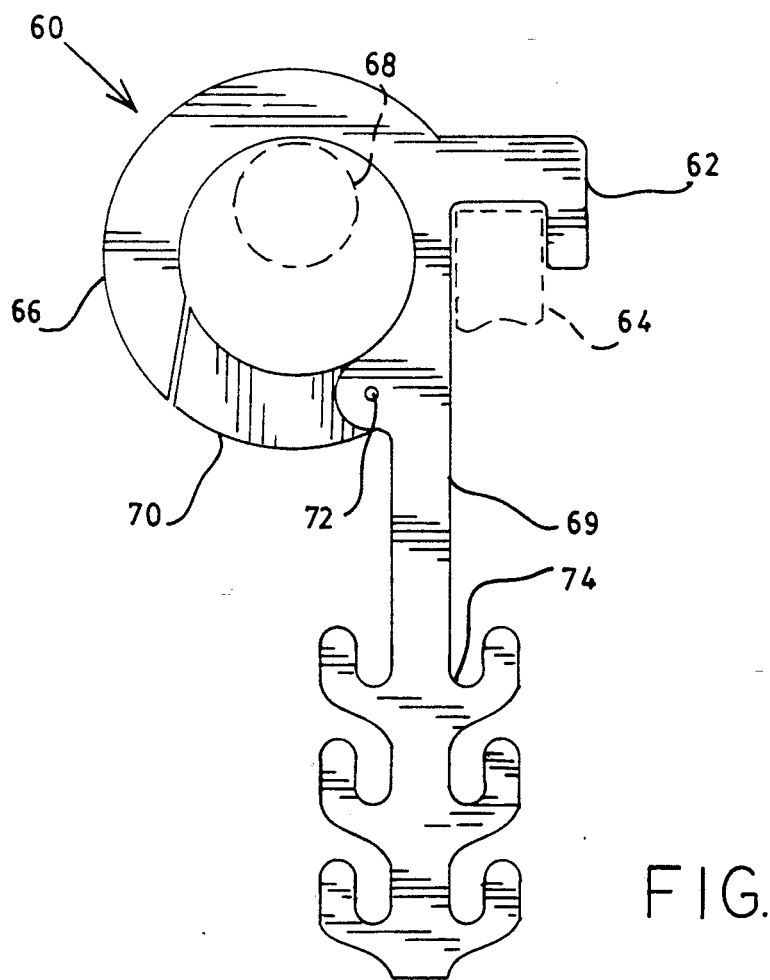
FIG. 5 is a drawing of an accessory adapter useful with the portable portion of the present invention for hanging the device of FIG. 2 at a selected height in selected locations.

An useful accessory unit 60 for the portable portion of the present invention is shown in FIG. 5. This unit has a hook 62 provided for supporting the same on the top of a door 64 or other similar structure. Further, there is provided a loop 66 that can be used to releasably attach the unit 60 to a shower rod 68 or the like. This can be accomplished by pressing a gate 70 against the rod 68 so that gate 70 is urged inwardly, pivoting about hinge 72. When in position on the rod 68, the gate will automatically close. In either position, the auxiliary unit has a depending shank 69 that has a plurality of hook-like notches 74 that permit hanging the portable unit 28 in an upside-down orientation using the projections 32, 34 on the handle 24. Thus the heated mirror can be positioned wherever a user wishes such that no hands are needed for support of the mirror. Further, as discussed above, the distal end 28 of the handle 24 can be inserted into the recess 19 of the housing 12 for hands-free support.

In a normal utilization of the present invention, the housing 12 will rest upon a flat surface of a countertop, such as that near a bathroom lavatory. The portable portion 26 is inserted into the cavity 14 of this housing such that the projection 38 activates the switch 50. If this condition exists, and the cord 22 is energized and the on/off switch 58 closed, current will flow to the heater unit 52. This causes a heating of the liquid (water) within the reservoir 42. When the temperature, as measured by the thermostat 56, reaches a selected value (typically about one hundred degrees F.), the thermostat will open until the temperature reaches some lower value (typically about ninety degrees) when the thermostat will again close. The timer can be utilized to remind a user that the heater has been energized, with an audible sound being provided when the time has elapsed. If the timer is a part of the electrical circuit, it can be used to turn off the heater.

When the portable portion is at the selected temperature, it can be removed for use. This automatically opens switch 50 and turns off the heater 52. Such use can be as a mirror with the handle affixed in the recess on the top of the housing 12. Due to the elevated temperature, no condensation will occur in a high humidity environment. The portable unit can also be hung upside down from the accessory unit that was described in connection with FIG. 5. After use in either applications, the portable unit can be again returned to the cavity 14 for either re-heating or for general storage.

From the foregoing it will be understood that a very useful device has been developed in the form of a portable mirror that can be preheated to prevent condensation during use in a high humidity environment, such as in a bathroom and particularly in a shower. The essentials of the device have been shown and described, together with optional features. This description, however, has not been to limit the invention but, rather, give a typical illustration thereof. Accordingly, this invention is to be limited only by the claims appended hereto, and their equivalents, when taken in combination with the complete description contained herein.

I claim:

1. A non-fogging mirror device for particular use in high humidity environments, which comprises:
   a housing means, said housing means having a top exposed surface and being provided with an internal cavity opening from one side of said housing, said cavity having a bottom surface, a top surface and a rear wall, said housing means further being provided with a recess in said top exposed surface;
   a pressure sensitive electrical switch means mounted in said rear wall of said cavity;
   an electrical heater means mounted in said bottom surface of said cavity;
   means for providing electrical power to said pressure sensitive switch and said heater means, said pressure sensitive switch and said heater means being electrically connected in series; and
   a portable mirror means adapted to be inserted in said cavity, said mirror means having a projection to engage said pressure sensitive switch and thereby connect said electrical power to said heater means when said mirror means is fully inserted into said cavity, said mirror means having a handle to be grasped by a user for insertion and removal of said mirror means from said cavity, said handle having a distal end for being releasably received in said recess of said housing means, said mirror means provided with an internal reservoir containing a liquid to be heated by said heater means and with a mirror surface oriented to face said heater means when said mirror means is inserted into said cavity.

2. The mirror device of claim 1 further comprising a thermostat means within said housing means connected in series with said pressure sensitive switch and said heater means whereby temperature produced by said heater means is controlled in a selected temperature range.

3. The mirror device of claim 1 further comprising a user-operated timer means mounted in said housing means for setting a selected time interval for heating of said liquid in said portable mirror means.

4. The mirror device of claim 3 wherein said timer means is provided with a sound producing means to audibly signal the elapse of said selected time interval.

5. The mirror device of claim 1 further comprising an on-off switch electrically connected in series with said pressure activated switch and said heater means.

6. The mirror device of claim 1 wherein said liquid in said reservoir is water.

7. The mirror device of claim 1 wherein said reservoir in said portable mirror means is surrounded with thermal insulation in all directions except toward said mirror surface to reduce heat loss from said liquid except to said mirror surface.

8. The mirror device of claim 1 wherein said mirror surface is chromium deposited upon a copper backing plate.

9. The mirror device of claim 1 wherein said distal end of said portable mirror means is provided with oppositely extending projections to be releasably held in said recess.

10. The mirror device of claim 9 further comprising a portable hanging unit for support of said portable mirror means in said environment, said hanging unit provided with engagement means to releasably fasten said hanging unit to structures in said environment, and further engagement means to engage said oppositely extending projections at said distal end of said portable mirror means whereby said portable mirror means is suspended in said environment.

11. The mirror device of claim 1 wherein said distal end of said portable mirror means is provided with a projection at about ninety degrees from a longitudinal axis of said portable mirror means, said projection useful in supporting said distal end when said portable mirror means is inserted in said cavity of said housing means.

12. A non-fogging mirror device for particular use in high humidity environments, which comprises:
   a housing means, said housing means provided with an internal cavity opening from one side of said housing, said cavity having a bottom surface, a top surface and a rear wall, said housing provided with a recess in a top surface;
   a pressure sensitive electrical switch means mounted in said rear wall;
   an electrical heater means mounted in said bottom surface of said cavity;
   a thermostat means within said housing means connected in series with said pressure sensitive switch and said heater means whereby temperature produced by said heater means is controlled in a selected temperature range;
   means for providing electrical power to said pressure sensitive switch and said heater means, said pressure sensitive switch and said heater means being electrically connected in series;
   a portable mirror means adapted to be inserted in said cavity, said mirror means having a projection to engage said pressure sensitive switch and thereby connect said electrical power to said heater means when said mirror means is inserted into said cavity, said mirror means having a handle to be grasped by a user for insertion and removal of said mirror means from said cavity, said handle having a distal end having oppositely-directed projections adapted to be releasably inserted in said recess of said housing means, said mirror means being provided with an internal reservoir containing a liquid to be heated by said heater means and with a mirror surface oriented to face said heater means when said mirror means is inserted into said cavity, said reservoir being provided with external insulation on all surfaces except toward said mirror surface; and a timer means mounted in said housing means for setting a selected time interval for heating of said liquid in said portable mirror means.

13. The mirror device of claim 12, wherein said timer means is provided with a sound producing means to audibly signal the elapse of said selected time interval.

14. The mirror device of claim 12 further comprising an on-off switch electrically connected in series with said pressure activated switch and said heater means.

15. The mirror device of claim 12 wherein said liquid in said reservoir is water.

16. The mirror device of claim 12 wherein said mirror surface is chromium deposited upon a copper backing plate.

17. The mirror device of claim 12 wherein said distal end of said portable mirror means is provided with a projection at about ninety degrees from a longitudinal axis of said portable mirror means, said projection useful in supporting said distal end when said portable mirror means is inserted in said cavity of said housing means.

18. The mirror device of claim 12 further comprising a portable hanging unit for support of said portable mirror means in said environment, said hanging unit provided with engagement means to releasably fasten said hanging unit to structures in said environment, and further engagement means to engage said oppositely directed projections at said distal end of said portable mirror means whereby said portable mirror means is suspended in said environment.

* * * * *